US012789270B2

(12) United States Patent
Berglind et al.

(10) Patent No.: US 12,789,270 B2
(45) Date of Patent: Nov. 10, 2026

(54) BACKSIDE COUNTERSINKING INSERTED CUTTER

(71) Applicant: The Boeing Company, Arlington, VA (US)

(72) Inventors: Luke Adam Berglind, St. Louis, MO (US); Matthew Shawn Callaway, St. Charles, MO (US)

(73) Assignee: THE BOEING COMPANY, Arlington, VA (US)

( * ) Notice: Subject to any disclaimer, the term of this patent is extended or adjusted under 35 U.S.C. 154(b) by 658 days.

(21) Appl. No.: 18/324,236

(22) Filed: May 26, 2023

(65) Prior Publication Data

US 2024/0390995 A1 Nov. 28, 2024

(51) Int. Cl.
*B23B 51/10* (2006.01)

(52) U.S. Cl.
CPC ............ *B23B 51/102* (2013.01); *B23B 51/10* (2013.01); *Y10T 408/909* (2015.01)

(58) Field of Classification Search
CPC ..... B23B 51/10; B23B 51/102; Y10T 408/89; Y10T 408/909; Y10T 408/9093
USPC ......................................... 408/199, 227, 228
See application file for complete search history.

(56) References Cited

U.S. PATENT DOCUMENTS

| | | | | | |
|---|---|---|---|---|---|
| 4,799,834 | A * | 1/1989 | Wells | B23B 51/107 407/42 |
| 5,597,273 | A * | 1/1997 | Hirsch | B23B 51/10 408/199 |
| 5,816,753 | A * | 10/1998 | Hall | B23B 51/00 408/223 |
| 5,827,018 | A * | 10/1998 | Blankenship | B23B 51/107 408/82 |
| 6,158,929 | A * | 12/2000 | Fisher | B25B 23/0064 408/202 |
| 7,090,447 | B2 * | 8/2006 | Jager | B23B 51/108 408/118 |
| 7,147,409 | B2 * | 12/2006 | Wienhold | B23B 49/005 408/1 R |
| 8,469,642 | B1 * | 6/2013 | Garrick | B23B 51/108 408/189 |
| 2004/0179905 | A1 | 9/2004 | Weare | |
| 2006/0120814 | A1 * | 6/2006 | Lipohar | B23B 51/108 408/181 |
| 2022/0388073 | A1 * | 12/2022 | Yehud | B23B 27/007 |

FOREIGN PATENT DOCUMENTS

| | | | | |
|---|---|---|---|---|
| CN | 202963493 U | * | 6/2013 | B23C 5/00 |
| CN | 203804286 U | * | 9/2014 | |
| CN | 217474879 U | * | 9/2022 | |
| CN | 218799191 U | * | 4/2023 | |
| DE | 2756706 A1 | * | 6/1979 | |

(Continued)

*Primary Examiner* — Sunil K Singh
*Assistant Examiner* — Michael Vitale
(74) *Attorney, Agent, or Firm* — MH2 Technology Law Group LLP

(57) ABSTRACT

A countersink tool includes a shank having a shank longitudinal axis. The countersink tool also includes a neck coupled to or integral with the shank. The countersink tool also includes an insert housing coupled to or integral with the neck. The insert housing has an insert housing longitudinal axis. The insert housing longitudinal axis is parallel to and offset from the shank longitudinal axis.

17 Claims, 7 Drawing Sheets

(56) References Cited

FOREIGN PATENT DOCUMENTS

| | | | | | | |
|---|---|---|---|---|---|---|
| JP | 2003205407 | A | * | 7/2003 | ............ | B23C 5/006 |
| SU | 1139572 | A | * | 2/1985 | | |
| WO | WO-2013044589 | A1 | * | 4/2013 | ............ | B23C 5/006 |

* cited by examiner

BACKSIDE COUNTERSINKING INSERTED CUTTER

BACKGROUND

A countersink is a conical hole cut into a manufactured object, or the cutter used to cut such a hole. A common use is to allow the head of a countersunk bolt, screw, or rivet, when placed in the hole, to sit flush with or below the surface of the surrounding material. By comparison, a counterbore makes a flat-bottomed hole that might be used with a socket-head capscrew. A countersink may also be used to remove the burr left from a drilling or tapping operation, thereby improving the finish of the product and removing any hazardous sharp edges.

SUMMARY

A countersink tool is disclosed. The countersink tool includes a shank having a shank longitudinal axis. The countersink tool also includes a neck coupled to or integral with the shank. The countersink tool also includes an insert housing coupled to or integral with the neck. The insert housing has an insert housing longitudinal axis. The insert housing longitudinal axis is parallel to and offset from the shank longitudinal axis.

A countersink tool configured to form a countersink in an object is also disclosed. The countersink tool includes a shank having a shank width and a shank longitudinal axis. The countersink tool also includes a neck coupled to or integral with the shank. The neck has a neck width and a neck longitudinal axis. The countersink tool also includes an insert housing coupled to or integral with the neck. The insert housing has an insert housing width and an insert housing longitudinal axis. The insert housing width is less than the shank width and greater than the neck width. The shank longitudinal axis, the neck longitudinal axis, and the insert housing longitudinal axis are parallel to and laterally-offset from one another. The neck longitudinal axis is between the shank longitudinal axis and the insert housing longitudinal axis. The insert housing defines an opening and a slot. The countersink tool also includes an insert configured to be positioned within the slot in the insert housing. The insert defines an opening that is configured to be aligned with the opening in the insert housing when the insert is positioned within the slot. The insert includes a tapered surface. The tapered surface is oriented at an angle with respect to the insert housing longitudinal axis. The angle is from about 40 degrees to about 70 degrees. The neck, the insert housing, and the insert are configured to be inserted at least partially through a hole in the object. The tapered surface of the insert is configured to form the countersink in the object while the neck is positioned in the hole. A ratio of a diameter of the countersink to a diameter of the hole is from about 1.8:1 to about 3:1.

A method for producing a countersink in an object is also disclosed. The method includes aligning an insert housing of a countersink tool with a hole in an object. The insert housing has an insert housing longitudinal axis. The method also includes moving the insert housing and a neck of the countersink tool at least partially through the hole while the insert housing is aligned with the hole. The method also includes aligning a shank of the countersink tool with the hole once the insert housing has passed through the hole. The shank has a shank longitudinal axis. The insert housing longitudinal axis is parallel to and offset from the shank longitudinal axis.

DRAWINGS

The above and/or other aspects and advantages will become more apparent and more readily appreciated from the following detailed description of examples, taken in conjunction with the accompanying drawings, in which.

DETAILED DESCRIPTION

Figure 1:
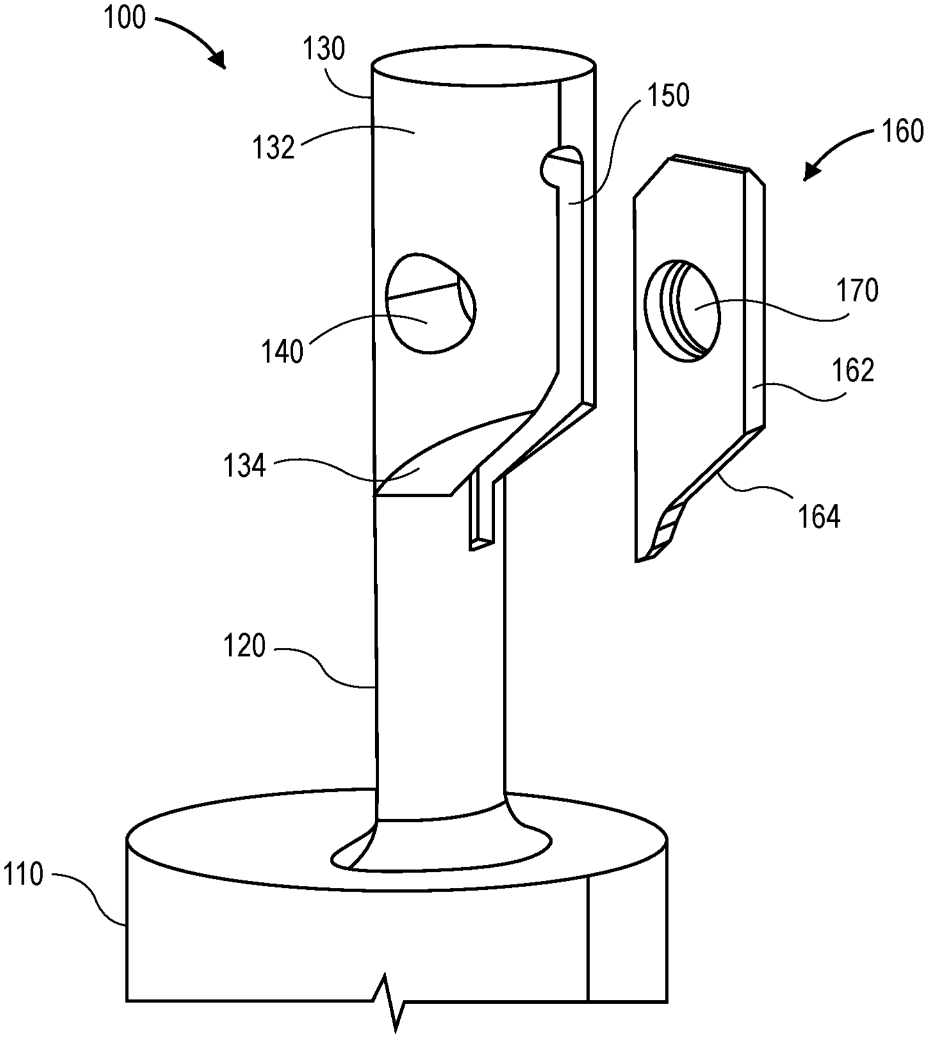
FIG. 1 illustrates a perspective view of a countersink tool, according to an example.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on." "associated with," "connected to," "electrically connected to," or "coupled to" to another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below." "lower," "above." "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

FIG. 1 illustrates a perspective view of a countersink tool (also referred to as a holder) 100, according to an example. The countersink tool 100 may include a shank (also referred to as a mounting shank) 110. The shank 110 may be at least partially cylindrical.

The countersink tool 100 may also include a neck 120 that is coupled to or integral with the shank 110. The neck 120 may be at least partially cylindrical. The neck 120 may have a smaller width (e.g., diameter) than the shank 110.

The countersink tool 100 may also include an insert housing 130 that is coupled to or integral with the neck 120. The neck 120 may be positioned between the shank 110 and the insert housing 130. The insert housing 130 may be at least partially cylindrical. The insert housing 130 may have a smaller width (e.g., diameter) than the shank 110 and a larger width (e.g., diameter) than the neck 120.

The insert housing 130 may include a side surface 132 and an inner surface 134. The side surface 132 may be at least partially cylindrical. The inner surface 134 may be substantially planar and face the shank 110 and/or the neck 120. The inner surface 134 may also or instead be referred to as a tapered surface. The insert housing 130 may also define an opening 140 formed at least partially therethrough. The insert housing 130 may also define a slot 150. In the example shown, the slot 150 is substantially vertical; however, the slot 150 may be any shape that is complimentary to the insert 160 (described below). As shown, the slot 150 may also be partially defined within the neck 120.

The countersink tool 100 may also include or be configured to receive an insert (also referred to as a cutter) 160. More particularly, the insert 160 may be configured to be inserted at least partially into the slot 150 formed in the neck 120 and/or the insert housing 130.

The insert 160 may include a side surface 162. The side surface 162 of the insert 160 may be configured to be recessed, flush, and/or protrude outward with respect to the side surface 132 of the insert housing 130 when the insert 160 is positioned within the slot 150. The insert 160 may also include an inner surface 164 that faces the shank 110 and/or the neck 120. The inner surface 164 may also or instead be referred to as a tapered surface and/or a cutting edge. The tapered surface 164 of the insert 160 may be configured to protrude outward with respect to the tapered surface 134 of the insert housing 130 when the insert 130 is positioned within the slot 150. This may allow the tapered surface (i.e., the cutting edge) 164 to cut the countersink into the object, as described below.

The insert 160 may also define an opening 170 formed at least partially therethrough. The openings 140, 170 may be aligned when the insert 160 is positioned within the slot 150. This may allow a fastening member (e.g., screw or bolt) to be inserted to through the openings 140, 170 to couple the insert 160 to the insert housing 130 (i.e., to secure the insert 160 within the slot 150). In another embodiment, the insert 160 may be brazed or adhered to the slot 150 in the insert housing 130.

Figure 2:
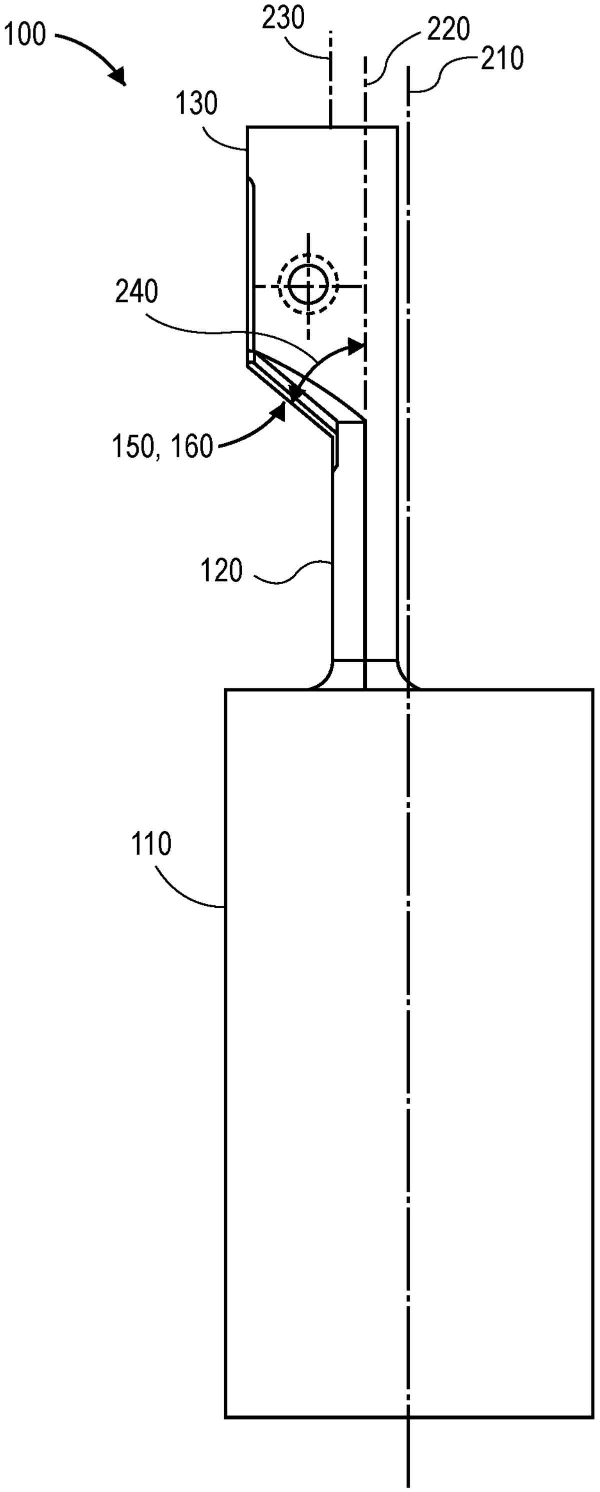
FIG. 2 illustrates a side view of the countersink tool, according to an example.

FIG. 2 illustrates a side view of the countersink tool 100, according to an example. The shank 110, the neck 120, and the insert housing 130 may each have a central longitudinal axis 210, 220, 230 extending therethrough. More particularly, the shank 110 may have a shank longitudinal axis 210, the neck 120 may have a neck longitudinal axis 220, and the insert housing 130 may have an insert housing longitudinal axis 230. The axes 210, 220, 230 may be parallel to one another. The axes 210, 220, 230 may also be laterally-offset from (i.e., not aligned with) one another. As described below, the countersink tool 100 may be configured to rotate around the shank longitudinal axis 210 when forming the countersink in the object. In the embodiment shown, the shank longitudinal axis 210 may not extend through the neck 120 and/or the insert housing 130. The neck longitudinal axis 220 may be between the axes 210, 230. The insert housing longitudinal axis 230 may be referred to herein as an offset cutting axis.

The tapered surface 134 of the insert housing 130 and/or the tapered surface 164 of the insert 160 may be oriented at an angle 240 with respect to the axis 210 (and/or axes 220, 230). The angle 240 may be from about 40 degrees to about 70 degrees, about 45 degrees to about 65 degrees, or about 50 degrees to about 60 degrees.

Figure 4:
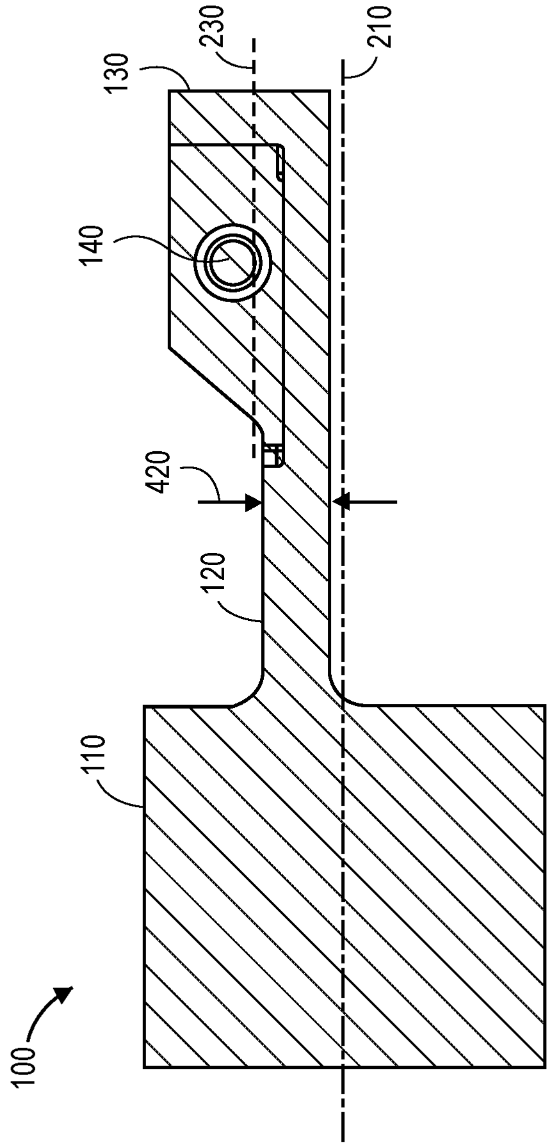
FIG. 4 illustrates a section view of the countersink tool taken through line 4-4 in FIG. 3, according to an example.
Figure 3:
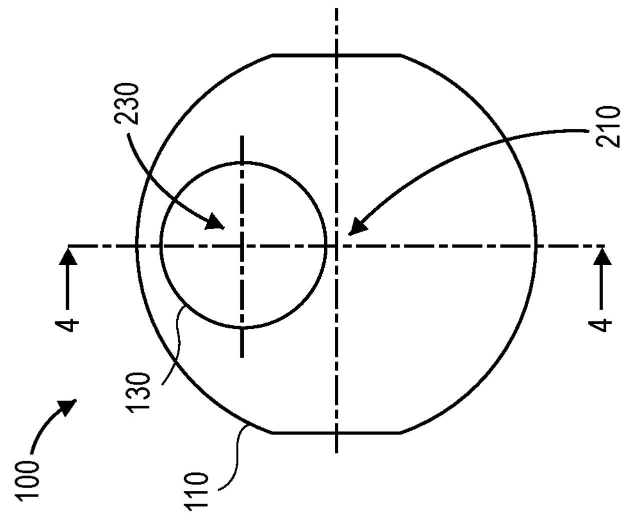
FIG. 3 illustrates a top view of the countersink tool, according to an example.

FIG. 3 illustrates a top view of the countersink tool 100, and FIG. 4 illustrates a section view of the countersink tool 100 taken through line 4-4 in FIG. 3, according to an example. A thickness 420 of the neck 120 may be determined based upon the hole diameter and/or the (e.g., desired) countersink diameter. More particularly, the maximum diameter 420 of the neck 120 may be determined based upon:

$$\text{Hole diameter} - (\text{countersink diameter} - \text{hole diameter})/2 \qquad \text{Equation (1)}$$

Figure 5:
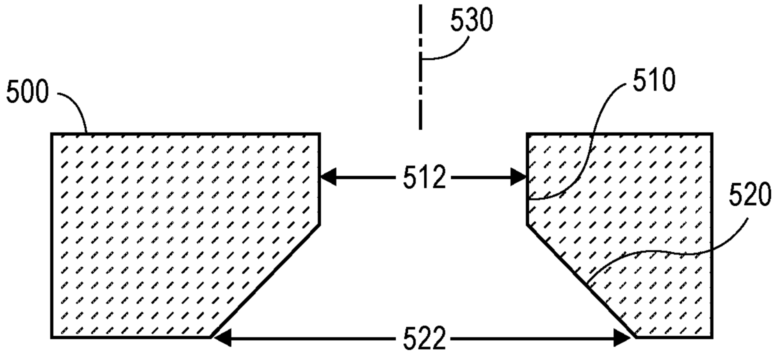
FIG. 5 illustrates a cross-sectional side view of an object with a hole and a countersink formed therein, according to an example.

FIG. 5 illustrates a cross-sectional side view of an object 500 with a hole 510 and a countersink 520 formed therein, according to an example. The hole diameter 512 refers to the width (e.g., diameter) of the hole 510 in the object 500. The neck 120, insert housing 130, and/or insert 160 are inserted through the hole 510 to form the countersink 520 in the object 500. The countersink diameter 522 refers to the (e.g., maximum) diameter of the countersink 520 formed in the object 500.

The geometry of the neck 120 may be the intersectional area of two cylinders with diameters equal to or less than the diameter of the hole 510 (or 512), with the first cylinder axis 210 along the axis of the shank 110, and the second cylinder axis 230 offset based upon the hole diameter 512 and/or the (e.g., desired) countersink diameter 522. More particularly, the second cylinder axis 230 may be offset by:

$$(\text{countersink diameter} - \text{hold diameter})/2 \qquad \text{Equation (2)}$$

Figure 6:
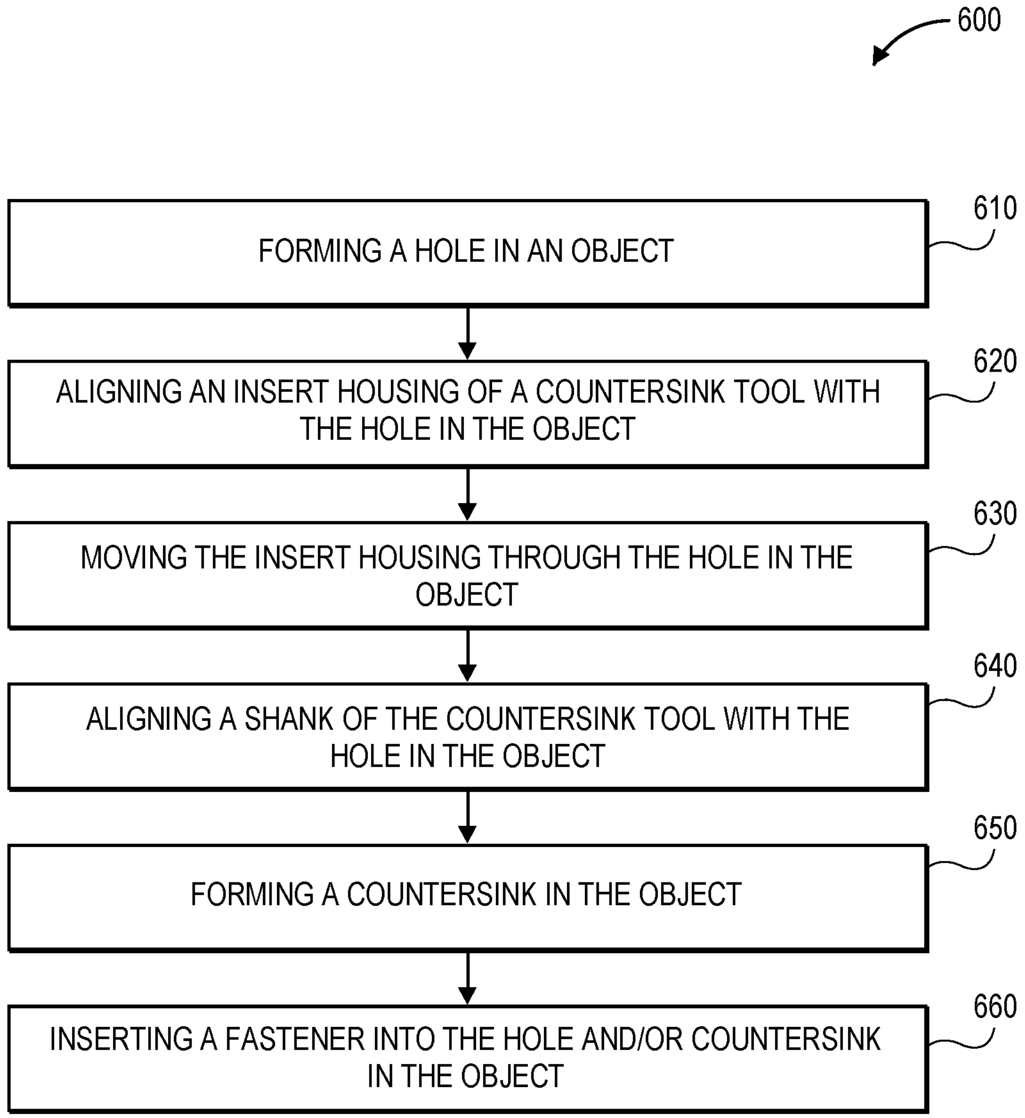
FIG. 6 illustrates a flowchart of a method for forming the countersink in the object, according to an example.

FIG. 6 illustrates a flowchart of a method 600 for forming the countersink 520 in the object 500, according to an example. An illustrative order of the method 600 is provided below; however, one or more steps of the method 600 may be performed in a different order, simultaneously, repeated, or omitted.

The method 600 may include forming the hole 510 in the object 500, as at 610. The object 500 may be part of a vehicle. For example, the object 500 may be part of an aircraft (e.g., helicopter, airplane, unmanned aerial vehicle) or a spacecraft (e.g., satellite, space probe, spaceship). In an example, the hole 510 may be formed by a drill.

Figures 7A, 7B, 7C, 7D:
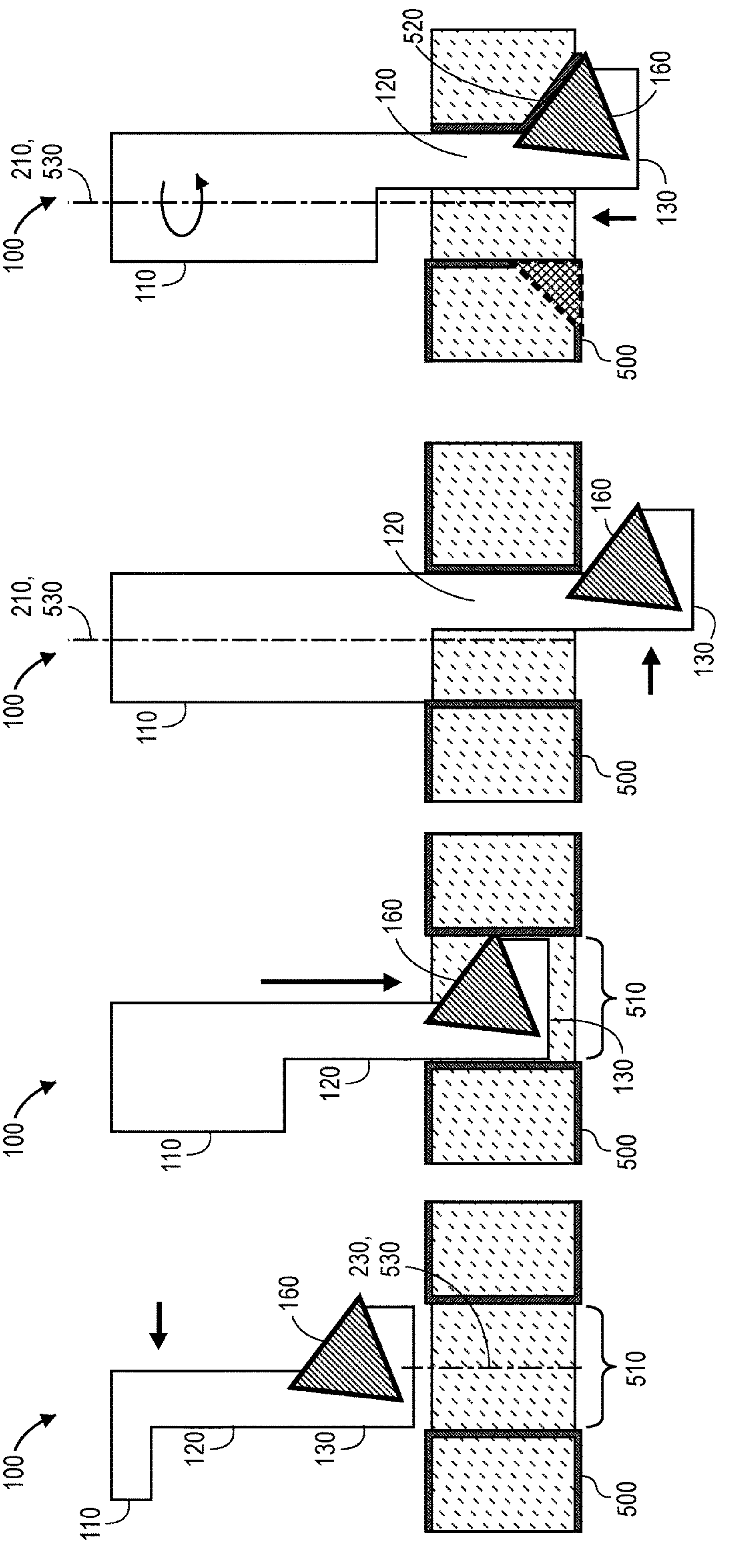
FIGS. 7A-7D illustrate cross-sectional side views of the countersink tool performing different steps of the method, according to an embodiment.

The method 600 may also include aligning the insert housing 130 with the hole 510 in the object 500, as at 620. This is shown in FIG. 7A. More particularly, the countersink tool 100 may be moved laterally (as shown by the arrow in FIG. 7A) to align the insert housing longitudinal axis 230 with the hole longitudinal axis 530.

The method 600 may also include moving the insert housing 130 through the hole 510 in the object 500, as at 630. This is shown in FIG. 7B. More particularly, the neck 120, the insert housing 130, and/or the insert 160 may be moved through the hole 510 in the object 500, as shown by the arrow in FIG. 7B. The axes 230, 530 may be aligned as the neck 120, the insert housing 130, and/or the insert 160 move through the hole 510 in the object 500.

The method 600 may also include aligning the shank 110 with the hole 510 in the object 500, as at 640. This is shown in FIG. 7C. More particularly, the countersink tool 100 may be moved laterally (as shown by the arrow in FIG. 7C) to align the shank longitudinal axis 210 with the hole longitudinal axis 530. This may cause the insert housing longitudinal axis 230 to become misaligned with the hole longitudinal axis 530.

The method 600 may also include forming the countersink 520 in the object 500, as at 650. This is shown in FIG. 7D. More particularly, the countersink tool 100 may be rotated around the shank longitudinal axis 210 and/or the hole longitudinal axis 530 (as shown by the upper arrow in FIG. 7D). In an embodiment, the shank longitudinal axis 210 may remain stationary as the countersink tool 100 rotates. In another embodiment, the shank longitudinal axis 210 may rotate around the hole longitudinal axis 530 as the countersink tool 100 rotates. An (e.g., upward) pulling force (as shown by the lower arrow in FIG. 7D) may be exerted on the countersink tool 100 as the countersink tool 100 rotates. The combination of the rotation and the pulling force may cause the insert 160 to cut/form the countersink 520 in the object 500. The countersink tool 100 may be able to cause a ratio of the countersink diameter 522 to the hole diameter 512 to be from about 1.8:1 to about 3:1, about 2.0:1 to about 3:1, or about 2.2:1 to about 3:1. In contrast, conventional countersink tools are not able to cause the ratio to be greater than 1.75:1.

Once the countersink 520 has been formed, the steps (e.g., 620-640) may be reversed to remove the countersink tool 100 from the object 500. Then, the method 600 may include inserting a fastener into the hole 510 and/or countersink 520 in the object 500, as at 660. The fastener may be or include a countersunk bolt, screw, or rivet. A head of the fastener may be positioned at least partially in the countersink 520 such that an outer surface of the head may be flush or recessed with respect to the surface of the object 500.

Figure 8C:
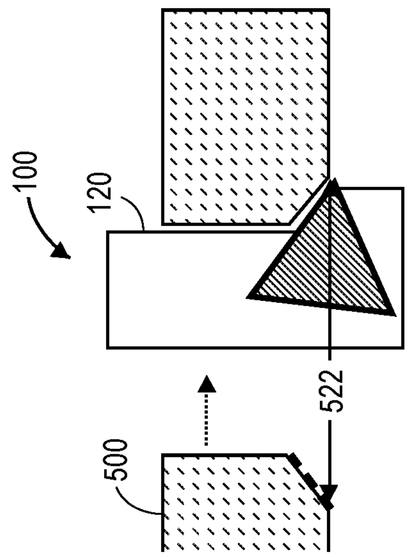
FIGS. 8A-8C illustrate cross-sectional side views of the countersink tool with different neck sizes, according to an example.
Figure 8B:
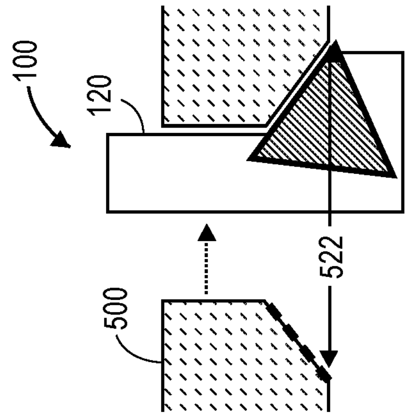
Figure 8A:
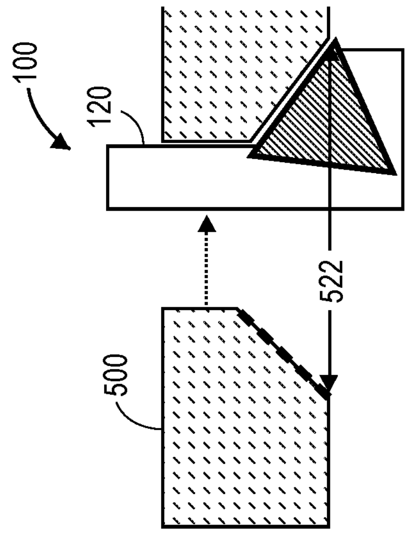

FIGS. 8A-8C illustrate cross-sectional side views of the countersink tool 100 with different neck sizes, according to an example. The size of the countersink diameter 522 may be based at least partially upon the width (e.g., diameter) of the neck 120. More particularly, as the width of the neck 120 increases, the countersink diameter 522 decreases. FIG. 8A shows a first (e.g., thinner) neck 130 and a first (e.g., larger) countersink diameter 522. FIG. 8B shows a second (e.g., intermediate) neck 130 and a second (e.g., intermediate) countersink diameter 522. FIG. 8C shows a third (e.g., thicker) neck 130 and a third (e.g., smaller) countersink diameter 522.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A countersink tool configured to form a countersink in an object, the countersink tool comprising:

a shank having a shank width and a shank longitudinal axis;

a neck coupled to or integral with the shank, wherein the neck has a neck width and a neck longitudinal axis;

an insert housing coupled to or integral with the neck, wherein the insert housing has an insert housing width and an insert housing longitudinal axis, wherein the insert housing width is less than the shank width and greater than the neck width, wherein the shank longitudinal axis, the neck longitudinal axis, and the insert housing longitudinal axis are parallel to and laterally-offset from one another, wherein the neck longitudinal axis is disposed between the shank longitudinal axis and the insert housing longitudinal axis, and wherein the insert housing defines an opening and a slot; and an insert configured to be positioned within the slot in the insert housing, wherein the insert defines an opening that is configured to be aligned with the opening in the insert housing when the insert is positioned within the slot, wherein the insert comprises a tapered surface, wherein the tapered surface is oriented at an angle with respect to the insert housing longitudinal axis, wherein the angle is from about 40 degrees to about 70 degrees, wherein the neck, the insert housing, and the insert are configured to be inserted at least partially through a hole in the object, wherein the tapered surface of the insert is configured to form the countersink in the object while the neck is positioned in the hole, and wherein the countersink tool is configured to form the countersink in the object such that a ratio of a diameter of the countersink to a diameter of the hole is from about 1.8:1 to about 3:1.

2. The countersink tool of claim 1, wherein the neck also defines a portion of the slot.

3. The countersink tool of claim 1, wherein the neck width is less than:

$$\text{the diameter of the hole} - (\text{the diameter of the countersink} - \text{the diameter of the hole})/2.$$

4. The countersink tool of claim 1, wherein the hole has a hole longitudinal axis, and wherein the neck longitudinal axis is offset from the hole longitudinal axis by:

$$(\text{the diameter of the countersink} - \text{the diameter of the hole})/2.$$

5. The countersink tool of claim 1, wherein the insert housing comprises a side surface and a tapered surface, wherein a side surface of the insert is flush or recessed with respect to the side surface of the insert housing when the insert is positioned within the slot, and wherein the tapered surface of the insert protrudes beyond the tapered surface of the insert housing when the insert is positioned within the slot.

6. The countersink tool of claim 1, wherein the shank longitudinal axis does not extend through the neck or the insert housing.

7. The countersink tool of claim 1, wherein the neck longitudinal axis does not extend through the opening in the insert housing.

8. The countersink tool of claim 1, wherein the insert housing longitudinal axis does not extend through the neck.

9. The countersink tool of claim 1, wherein the insert housing longitudinal axis extends through the opening in the insert housing.

10. The countersink tool of claim 9, wherein the insert housing longitudinal axis does not extend through a center of the opening in the insert housing.

11. A method for producing a countersink in an object, the method comprising:

providing the countersink tool of claim 1;

aligning the insert housing of the countersink tool with the hole in the object, wherein the insert is positioned within the insert housing;

moving the insert housing and the neck of the countersink tool at least partially through the hole while the insert housing is aligned with the hole; and aligning the shank of the countersink tool with the hole once the insert housing has passed through the hole.

12. The method of claim 11, wherein forming the countersink comprises:

exerting a force on the countersink tool that moves the insert housing and the insert in a direction that is parallel with the insert housing longitudinal axis and toward the hole; and rotating the countersink tool around the shank longitudinal axis.

13. The method of claim 11, further comprising replacing the neck with a different neck having a different thickness to vary a diameter of the countersink.

14. The method of claim 11, wherein the shank longitudinal axis does not extend through the neck or the insert housing.

15. The method of claim 11, wherein the neck longitudinal axis does not extend through the opening in the insert housing.

16. The method of claim 11, wherein the insert housing longitudinal axis does not extend through the neck.

17. The method of claim 11, wherein the insert housing longitudinal axis extends through the opening in the insert housing.

* * * * *